United States Patent [19]

Huber

[11] Patent Number: 4,992,197

[45] Date of Patent: Feb. 12, 1991

[54] AQUEOUS GLASS CLEANING COMPOSITION COMPRISING PHOSPHORIC ACID AND ETHANOLAMINE

[76] Inventor: Hermann J. Huber, 3, Melbourne Road, Teddington, Middlesex, England

[21] Appl. No.: 356,969

[22] Filed: May 25, 1989

[30] Foreign Application Priority Data

May 27, 1988 [GB] United Kingdom ................ 8812679

[51] Int. Cl.[5] ......................... C11D 7/50; C11D 7/00; C11D 7/08; C09D 9/00

[52] U.S. Cl. .................................... 252/148; 252/142; 252/136; 252/143; 252/171; 252/170; 252/DIG. 10; 252/174.19; 252/174

[58] Field of Search .......... 252/174.19, 174, DIG. 10, 252/170, 171, 143, 136, 142, 148

[56] References Cited

U.S. PATENT DOCUMENTS 3,696.043 10/1972 Labarge et al. .................... 252/153
4,086,178 4/1978 Walker ............................... 252/143
4,212,759 7/1980 Young et al. ....................... 252/119
4,587,030 5/1986 Casey .................................. 252/92
4,822,854 4/1989 Ciolino .......................... 252/174.19

FOREIGN PATENT DOCUMENTS 6403079 9/1965 Netherlands .

*Primary Examiner*—Paul Lieberman
*Assistant Examiner*—James M. Silbermann
*Attorney, Agent, or Firm*—Biebel, French & Nauman

[57] ABSTRACT

A glass cleaning composition comprises an aqueous solution having a pH value greater than 2 but not greater than 4, the composition including an anionic surface active agent, phosphoric acid and an ethanolamine, the ethanolamine being in a sufficient quantity to combine with one valency of the phosphoric acid.

8 Claims, No Drawings

AQUEOUS GLASS CLEANING COMPOSITION COMPRISING PHOSPHORIC ACID AND ETHANOLAMINE

This invention relates to a glass cleaning composition, particularly but not exclusively useful in cleaning the windscreens of motor and like vehicles.

Various proposals have been made for cleaning windscreens to remove contaminants deposited thereon during the normal use of the vehicle. In particular, there was a proposal in patent specification No. 1081351, for the use of a cleaning composition which was acidic in nature as opposed to the usual alkaline solutions. The reason for this was that by using an acidic composition, it was possible to break down the electrochemical bonding which occurred between certain of the contaminants and the glass of the windscreen.

The proposed composition was satisfactory for many years until it was found that, with advanced paints and painting techniques, there were instances where the paint was attacked by the composition and left an irreversible discolouration or other damage to the paintwork.

The present invention seeks to provide an improved glass cleaning composition which, while maintaining its ability to break down the above electrochemical bonding, will nevertheless not harm the paints which are now used in automobile manufacture.

According to the invention, a glass cleaning composition comprises an aqueous solution having a pH value greater than 2 but not greater than 4, the composition including an anionic surface active agent, phosphoric acid and an ethanolamine, the ethanolamine being in a sufficient quantity to combine with one valency of the phosphoric acid.

Preferably the pH value of the solution is between 2.5 and 3.0.

The acid may be orthophosphoric acid. The ethanolamine may be any one of monoethanolamine, diethanolamine or triethanolamine. If the ethanolamine is monoethanolamine, the ratio of acid to ethanolamine may be 1.7:0.5 by weight. If the ethanolamine is diethanolamine, the ratio of acid to ethanolamine may be in the range 1.5:1 to 2:1 by weight (preferably 1.7:1). If the ethanolamine is triethanolamine, the ratio of acid to ethanolamine may be 1.7:1.5 by weight. The ratio of surface active agent to phosphoric acid may be in the range 0.5:1 to 2:1.

The invention also includes a concentrated aqueous solution which can be diluted solely with water to a concentration such as to produce a glass cleaning composition as above referred to.

Two examples of the invention will now be described.

EXAMPLE 1

A composition with the following constituents was made up:

| Constituent | % by volume |
|---|---|
| Industrial ethanol | 50.0 |
| Triethanolamine salt of a sulphonated dodecyl benzene | 1.4 |
| Industrial lauryl ether sulphate | 0.45 |
| Orthophosphoric acid (s.g. 1.70) | 1.0 |
| Diethanolamine | 1.0 |
| Water | 46.15 |

-continued

To this could be added a trace amount of a dye.

Of these constituents, the industrial ethanol is an anti-freeze, the next two are anionic surface active agents and may be used in the form known as EMPIMIN KSN 60 and NANSA T 60 respectively, orthophosphoric acid is the acidic component and diethanolamine is a buffer. The nominal pH value of this product is 3.5.

Tests have shown that this product has excellent cleaning properties and no deleterious effect on most types of paint. The addition of the buffering agent, diethanolamine, does not, as might be expected, reduce the efficacy of the composition but in fact adds to its operation by virtue of the fact that it is an emulsifying agent. Due to the inclusion of antifreeze, it can be used in low temperatures.

EXAMPLE 2

A composition with the following constituents was made up:

| Component | parts by weight |
|---|---|
| Water | 100.00 |
| Commercial alkyl aryl sulphonate (27% active matter) | 0.25 |
| Commercial orthophosphoric acid | 0.26 |
| Diethanolamine | 0.15 |

Tests have also shown that this is an excellent cleaning product. The nominal pH value is 2.6.

The buffer component reacts with the acid by replacement of one of the hydrogen atoms. Thus theoretically, with orthophosphoric acid and diethanolamine, the compound di-hydrogen: diethanolamine: phosphoric acid is formed.

It will be understood that the above are only examples and are not intended to limit the invention. Other suitable surface active agents and/or antifreeze components may be used.

The invention also envisages producing the glass cleaning composition in concentrated form which may, for example be diluted to twenty times its volume by the addition of water to bring it to a suitable concentration for use. One such concentrated form may suitably comprise a solution of the surface active agents, acidic components and ethanolamines in isopropyl alcohol, ethyl alcohol or methyl alcohol, the latter providing antifreeze properties.

Although the composition has been designed particularly with automobile windscreens in mind, it may also be used in other circumstances for cleaning other types of glass objects.

I claim:

1. A glass cleaning composition comprising an aqueous solution having a pH value greater than about 2 but not greater than 4, the composition including an anionic surface active agent, phosphoric acid and an ethanolamine to combine as a buffer with one valency of the phosphoric acid, the phosphoric acid being present in an amount by weight relative to the ethanolamine of about 1.13–3.4:1 and the anionic surface active agent being present in an amount by weight relative to the phosphoric acid of about 0.5–2:1.

2. A glass cleaning composition as claimed in claim 1, wherein the pH value of the aqueous solution is between about 2.5 and about 3.0.

3. A glass cleaning composition as claimed in claim 1, or 2, wherein the acid is orthophosphoric acid.

4. A glass cleaning composition as claimed in claim 1 or 2, wherein the ethanolamine is monoethanolamine and the ratio of acid to ethanolamine is 1.7:0.5.

5. A glass cleaning composition as claimed in claim 1 or 2, wherein the ethanolamine is diethanolamine and the ratio of acid to ethanolamine is in the range 1.5:1 to 2.0 to 1 by weight.

6. A glass cleaning composition as claimed in claim 5, wherein the ratio of acid to ethanolamine is 1.7:1.

7. A glass cleaning composition as claimed in claim 1 or 2, wherein the ethanolamine is triethanolamine and the ratio of acid to ethanolamine is 1.7:1.5.

8. A glass cleaning composition as claimed in claim 1 or 2, wherein the ratio of surface active agent to phosphoric acid is in the range 0.5:1 to 2:1.

* * * * *